(12) United States Patent
Figueredo de Santana et al.

(10) Patent No.: US 11,514,334 B2
(45) Date of Patent: Nov. 29, 2022

(54) MAINTAINING A KNOWLEDGE DATABASE BASED ON USER INTERACTIONS WITH A USER INTERFACE

(71) Applicant: International Business Machines Corporation, Armonk, NY (US)

(72) Inventors: Vagner Figueredo de Santana, São Paulo (BR); Bernardo Goncalves, Sao Paulo (BR); Alecio Pedro Delazari Binotto, Munich (DE); Ana Paula Appel, São Paulo (BR); Renato Luiz de Freitas Cunha, São Paulo (BR)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 396 days.

(21) Appl. No.: 16/784,371

(22) Filed: Feb. 7, 2020

(65) Prior Publication Data

US 2021/0248482 A1 Aug. 12, 2021

(51) Int. Cl.
*G06N 5/02* (2006.01)
*G06F 16/11* (2019.01)

(52) U.S. Cl.
CPC .............. *G06N 5/02* (2013.01); *G06F 16/11* (2019.01)

(58) Field of Classification Search
None
See application file for complete search history.

(56) References Cited

U.S. PATENT DOCUMENTS 5,506,780 A * 4/1996 Montenbruck ........ B64G 1/242
                                                            701/13
5,673,369 A     9/1997 Kim
                    (Continued)

FOREIGN PATENT DOCUMENTS

KR        20180015561 A       2/2018

OTHER PUBLICATIONS

E. Chiabrando., "Dynamic interface reconfiguration based on dierent ontological relations." https://www.researchgate.net/publication/221097717 Jul. 2011. 11 Pages.

(Continued)

*Primary Examiner* — Lonnie V Sweet
(74) *Attorney, Agent, or Firm* — Cantor Colburn LLP; Joseph Petrokaitis

(57) ABSTRACT

Techniques for maintaining a knowledge database system based on user interactions with the database system are described herein. An aspect includes generating a user interface based on a knowledge database comprising a plurality of entities, wherein the user interface comprises a plurality of user interface elements, each user interface element of the plurality of user interface elements corresponding to one or more of the plurality of entities of the knowledge database. Another aspect includes receiving a user interaction corresponding to the user interface. Another aspect includes updating the knowledge database based on the received user interaction, wherein updating the knowledge database based on the received user interaction includes determining a user interface element associated with the received user interaction, mapping the determined user interface element to a first entity of the plurality of entities of the knowledge database, and performing a weight update corresponding to the first entity.

17 Claims, 5 Drawing Sheets

(56) References Cited

U.S. PATENT DOCUMENTS

| | | | |
|---|---|---|---|
| 7,451,142 B2* | 11/2008 | Arellanes | G06F 16/30 707/999.005 |
| 7,634,474 B2 | 12/2009 | Vassilvitskii et al. | |
| 7,962,495 B2 | 6/2011 | Jain et al. | |
| 8,620,909 B1 | 12/2013 | Rennison | |
| 8,903,711 B2 | 12/2014 | Lundberg et al. | |
| 9,104,779 B2 | 8/2015 | Hunt et al. | |
| 9,754,210 B2 | 9/2017 | Xia et al. | |
| 10,223,637 B1* | 3/2019 | Czuba | G06N 20/00 |
| 10,248,669 B2 | 4/2019 | Sweeney et al. | |
| 10,311,529 B1* | 6/2019 | Noel | G06Q 30/0611 |
| 10,776,337 B2* | 9/2020 | Ding | G06F 16/9024 |
| 2004/0133393 A1* | 7/2004 | Misium | G06N 5/02 702/181 |
| 2016/0155057 A1* | 6/2016 | Lu | G06Q 10/06 706/46 |
| 2016/0350307 A1 | 12/2016 | Verweyst et al. | |
| 2018/0225380 A1 | 8/2018 | Netto et al. | |
| 2019/0189288 A1* | 6/2019 | Zhu | G06F 16/313 |
| 2019/0220978 A1 | 7/2019 | Moehrle et al. | |
| 2019/0236464 A1* | 8/2019 | Feinson | G06N 5/02 |
| 2020/0394185 A1* | 12/2020 | Tian | G06F 40/284 |
| 2021/0081717 A1* | 3/2021 | Creed | G06N 3/084 |
| 2021/0110047 A1* | 4/2021 | Fang | H04L 9/50 |
| 2021/0248482 A1* | 8/2021 | Figueredo de Santana | G06N 5/02 |
| 2022/0020454 A1* | 1/2022 | Pae | G16H 50/70 |
| 2022/0067115 A1* | 3/2022 | Zheng | G06N 5/02 |

OTHER PUBLICATIONS

S. Lgarch et al., "Toward a use of ontology to reinforcing semantic classification of message based on LSA." World Academy of Science, Engineering and Technology International Journal of Computer and Information Engineering vol. 4, No. 6, 2010. 7 Pages.

Damljanovic et al. "Natural language interfaces to ontologies: Combining syntactic analysis and ontology-based lookup through the user interaction" Extended Semantic Web Conference. Springer, Berlin, Heidelberg, (May 2010) pp. 106-120.

Wang et al. "Knowledge Graph Design: A Way to Promote User Experience for Online Education" In: Marcus, A., Wang, W. (eds) Design, User Experience, and Usability: Theory, Methodology, and Management. DUXU 2017. Lecture Notes in Computer Science(), vol. 10288. Springer, Cham. https://doi.org/10.1007/978-3-319-58634-2_56 (27 pages).

Xu et al. "LogCanvas: visualizing search history using knowledge graphs" The 41st International ACM SIGIR Conference on Research & Development in Information Retrieval. (Jun. 2018) pp. 1289-1292.

\* cited by examiner

MAINTAINING A KNOWLEDGE DATABASE BASED ON USER INTERACTIONS WITH A USER INTERFACE

BACKGROUND

The present invention generally relates to computer systems, and more specifically, to computer-implemented methods and related computing systems configured and arranged to maintain a knowledge database based on user interactions with a user interface that accesses the knowledge database.

Knowledge database systems are computer systems that emulate human reasoning by receiving a natural language inquiry/problem queries and providing a response thereto. Knowledge database systems rely on natural language processing and machine learning techniques to interpret encoded knowledge of human experts stored in a database referred to as a knowledge database. If the domain of the knowledge database, or the scope of the inquiry or problem presented, is sufficiently narrow and an adequately large body of knowledge is properly coded in the knowledge database, the knowledge database system can achieve performance matching or exceeding the ability of a human expert. In such a case, the knowledge database system can be referred to as an expert system. Expert systems can be designed, at least in theory, for virtually any application ranging from medical diagnosis, automobile repair consultation, and inventory control, to many other uses.

Thus, knowledge database systems are artificially intelligent computer systems configured to utilize machine learning algorithms to store data and logic in a knowledge database that represents characteristics of a real-world system. The knowledge database of an artificially intelligent expert system can include an ontology and a set of axioms, and an expert system that simulates the operations of a business can include ontologies and axioms derived from representations of those operations stored in a business process model.

SUMMARY

Embodiments of the present invention are directed to maintaining a knowledge database based on user interactions with a user interface of the knowledge database. A non-limiting example computer-implemented method includes generating a user interface based on a knowledge database comprising a plurality of entities, wherein the user interface comprises a plurality of user interface elements, each user interface element of the plurality of user interface elements corresponding to one or more of the plurality of entities of the knowledge database. The method also includes receiving a user interaction corresponding to the user interface. The method also includes updating the knowledge database based on the received user interaction, wherein updating the knowledge database based on the received user interaction includes determining a user interface element associated with the received user interaction, mapping the determined user interface element to a first entity of the plurality of entities of the knowledge database, and performing a weight update corresponding to the first entity.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

DETAILED DESCRIPTION

Figure 1:
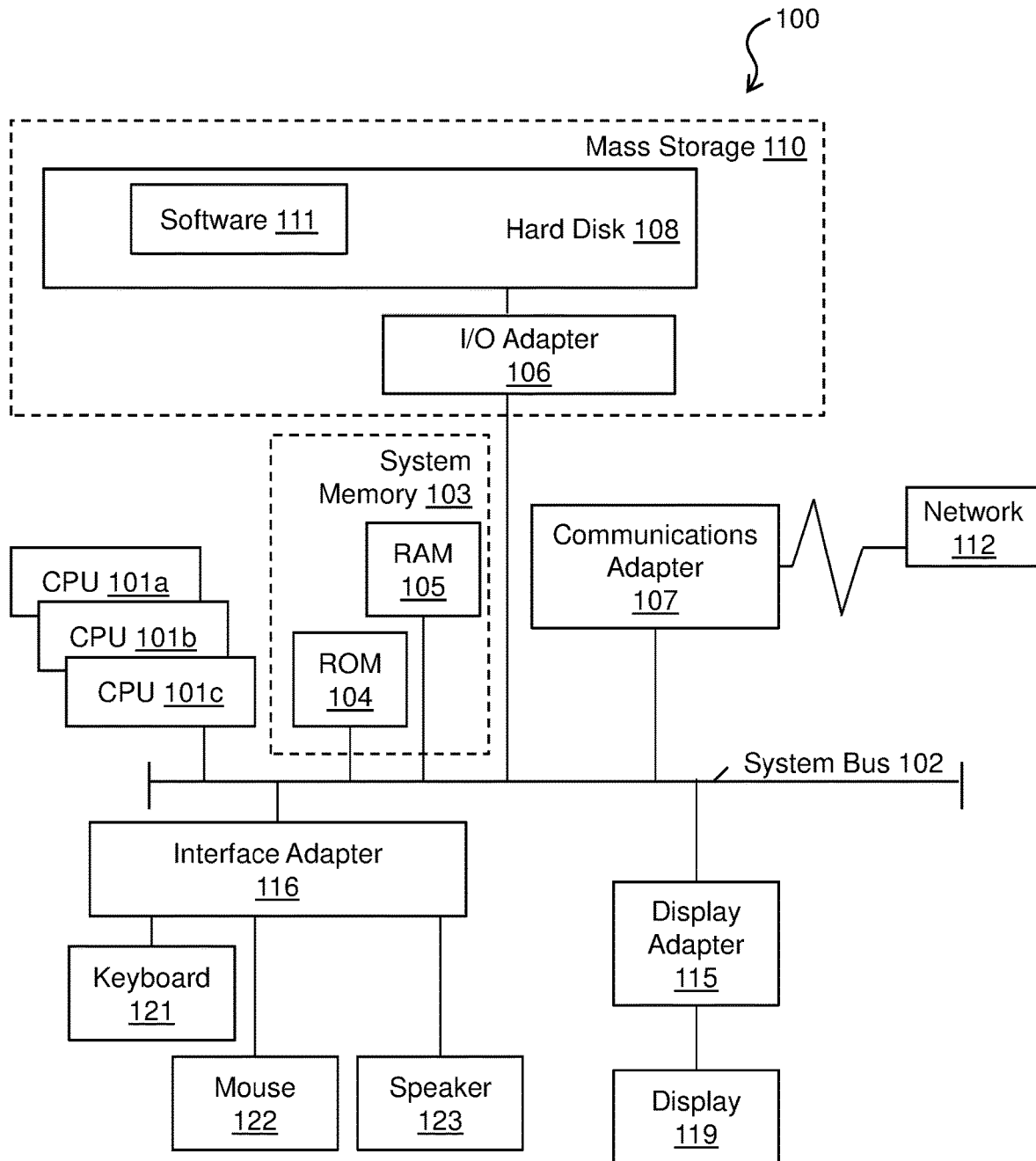
FIG. 1 is a block diagram of an example computer system for implementing various aspects of a knowledge database system in accordance with embodiments of the invention.

One or more embodiments of the present invention provide a user interface, along with a system for maintaining a knowledge database system based on user interactions with the user interface. A knowledge database system in accordance with aspects of the invention can include ontologies or knowledge graphs that define connections between entities to represent knowledge in a domain. In a knowledge database in accordance with aspects of the invention, such knowledge representations are used to perform inferences, create hypotheses, and provide answers to users in a manner that accurately represents the evolution of the knowledge in the domain. Because the overall number of entities and connections in a knowledge database can increase over time as additional knowledge is discovered in the field, and because individual knowledge database entities can become outdated and obsolete over time, a knowledge database system in accordance with aspects of the invention can be configured to dynamically make the connections between entities in the knowledge database stronger or weaker over time as knowledge in the domain is refined and expanded.

Knowledge database systems in accordance with aspects of the invention can include interconnected categories and entities. A knowledge database system in accordance with aspects of the invention can be configured and arranged to monitor user behavior through the collection and analysis of user interaction data via a user interface corresponding to the knowledge database. In accordance with aspects of the invention, the knowledge database system includes a network of sensors (e.g., image detectors, motion detectors, microphones, a keyboard, a mouse, etc.) configured to detect a variety of interactions by the user with the user interface. The interactions can correspond to any action by the user with respect to the user interface, including but not limited to moving and clicking a mouse; hitting keys on a keyboard; using a stylus; touching a touch display; hand gestures; facial expressions; verbal commands; and eye gaze interactions. In embodiments of the invention, this user interaction data that is generated from the user interface of the knowledge database system may be used to automatically update the knowledge database by, for example, reinforcing or weakening the connections between entities. In some embodiments of the invention, a category in the knowledge database system can correspond to a condition, and the connected entities can correspond to responses to the condition. Each entity connected to a category can have a corresponding weight. In some embodiments of the invention, entities corresponding to responses that are used and that achieve a good result can be reinforced and have their weights increased based on user interactions, while entities corresponding to responses that are used and achieve a bad result, or are not used, can have their weights decreased and be deprecated (e.g., removed) over time. Entities can be deprecated from the knowledge database system based on comparing a weight associated with an entity to a deprecation threshold. The weights of connections between entities in the knowledge database system can be increased or decreased based on the user interactions such that the knowledge database system can be updated by, e.g., pruning weak connections, thereby allowing the knowledge representation to evolve. A weight update to a connection in the knowledge database system can be propagated to other connected entities that are not explicitly included in the user interface but that are used in inferences, e.g., the connected entities may not be the main target of a user interaction, but may affect the generation of the user interface and be affected by the user interaction.

In accordance with aspects of the invention, the user interface can be generated for a user based on the knowledge database system. User interface elements corresponding to the knowledge database entities can be displayed in the user interface based on past user interactions with the user interface corresponding to the knowledge database system. Computing restrictions can exist in the so-called "user devices" that implement or interface with the knowledge database system. Such user devices can include mobile devices and Internet of Things (IoT) devices configured and arranged to perform processing based on the knowledge database system. Knowledge database systems in accordance with aspects of the invention can deprecate entities from the knowledge database system based on user interactions, thereby reducing the amount of processing power required by a user device that is performing processing based on the knowledge database system. The most used knowledge database system entities can be determined and tracked for a user or group of users, and snapshots of the knowledge database system can be created and stored for the user or group of users. In some embodiments of the invention, the stored snapshots of the knowledge database system allow the user interface to be customized for the particular users or group of users. A snapshot of the knowledge database corresponding to a particular user can reduce the computing power required to process a relatively large knowledge database (e.g., a small coffee producer using a mobile device with limited capabilities may or may not require an entire knowledge database representing a larger agriculture ontology). Example knowledge database entities can include, but are not limited to, a designation of a disease in medical imaging, or a treatment for a particular condition in a knowledge database system that supports physicians in cancer treatments.

Turning now to FIG. 1, a computer system 100 is generally shown in accordance with an embodiment of the invention. The computer system 100 can be an electronic, computer framework comprising and/or employing any number and combination of computing devices and networks utilizing various communication technologies, as described herein. The computer system 100 can be easily scalable, extensible, and modular, with the ability to change to different services or reconfigure some features independently of others. The computer system 100 may be, for example, a server, desktop computer, laptop computer, tablet computer, or smartphone. In some examples, computer system 100 may be a cloud computing node. Computer system 100 may be described in the general context of computer system executable instructions, such as program modules, being executed by a computer system. Generally, program modules may include routines, programs, objects, components, logic, data structures, and so on that perform particular tasks or implement particular abstract data types. Computer system 100 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, the computer system 100 has one or more central processing units (CPU(s)) 101a, 101b, 101c, etc. (collectively or generically referred to as processor(s) 101). The processors 101 can be a single-core processor, multi-core processor, computing cluster, or any number of other configurations. The processors 101, also referred to as processing circuits, are coupled via a system bus 102 to a system memory 103 and various other components. The system memory 103 can include a read only memory (ROM) 104 and a random access memory (RAM) 105. The ROM 104 is coupled to the system bus 102 and may include a basic input/output system (BIOS), which controls certain basic functions of the computer system 100. The RAM is read-write memory coupled to the system bus 102 for use by the processors 101. The system memory 103 provides temporary memory space for operations of said instructions during operation. The system memory 103 can include random access memory (RAM), read only memory, flash memory, or any other suitable memory systems.

The computer system 100 comprises an input/output (I/O) adapter 106 and a communications adapter 107 coupled to the system bus 102. The I/O adapter 106 may be a small computer system interface (SCSI) adapter that communicates with a hard disk 108 and/or any other similar component. The I/O adapter 106 and the hard disk 108 are collectively referred to herein as a mass storage 110.

Software 111 for execution on the computer system 100 may be stored in the mass storage 110. The mass storage 110 is an example of a tangible storage medium readable by the processors 101, where the software 111 is stored as instructions for execution by the processors 101 to cause the computer system 100 to operate, such as is described herein below with respect to the various Figures. Examples of computer program product and the execution of such instruction is discussed herein in more detail. The communications adapter 107 interconnects the system bus 102 with a network 112, which may be an outside network, enabling the computer system 100 to communicate with other such systems. In one embodiment, a portion of the system memory 103 and the mass storage 110 collectively store an operating system, which may be any appropriate operating system, such as the z/OS or AIX operating system from IBM Corporation, to coordinate the functions of the various components shown in FIG. 1.

Additional input/output devices are shown as connected to the system bus 102 via a display adapter 115 and an interface adapter 116 and. In one embodiment, the adapters 106, 107, 115, and 116 may be connected to one or more I/O buses that are connected to the system bus 102 via an intermediate bus bridge (not shown). A display 119 (e.g., a screen or a display monitor) is connected to the system bus 102 by a display adapter 115, which may include a graphics controller to improve the performance of graphics intensive applications and a video controller. A keyboard 121, a mouse 122, a speaker 123, etc. can be interconnected to the system bus 102 via the interface adapter 116, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI). Thus, as configured in FIG. 1, the computer system 100 includes processing capability in the form of the processors 101, and, storage capability including the system memory 103 and the mass storage 110, input means such as the keyboard 121 and the mouse 122, and output capability including the speaker 123 and the display 119.

In some embodiments, the communications adapter 107 can transmit data using any suitable interface or protocol, such as the internet small computer system interface, among others. The network 112 may be a cellular network, a radio network, a wide area network (WAN), a local area network (LAN), or the Internet, among others. An external computing device may connect to the computer system 100 through the network 112. In some examples, an external computing device may be an external webserver or a cloud computing node.

It is to be understood that the block diagram of FIG. 1 is not intended to indicate that the computer system 100 is to include all of the components shown in FIG. 1. Rather, the computer system 100 can include any appropriate fewer or additional components not illustrated in FIG. 1 (e.g., additional memory components, embedded controllers, modules, additional network interfaces, etc.). Further, the embodiments described herein with respect to computer system 100 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 2:
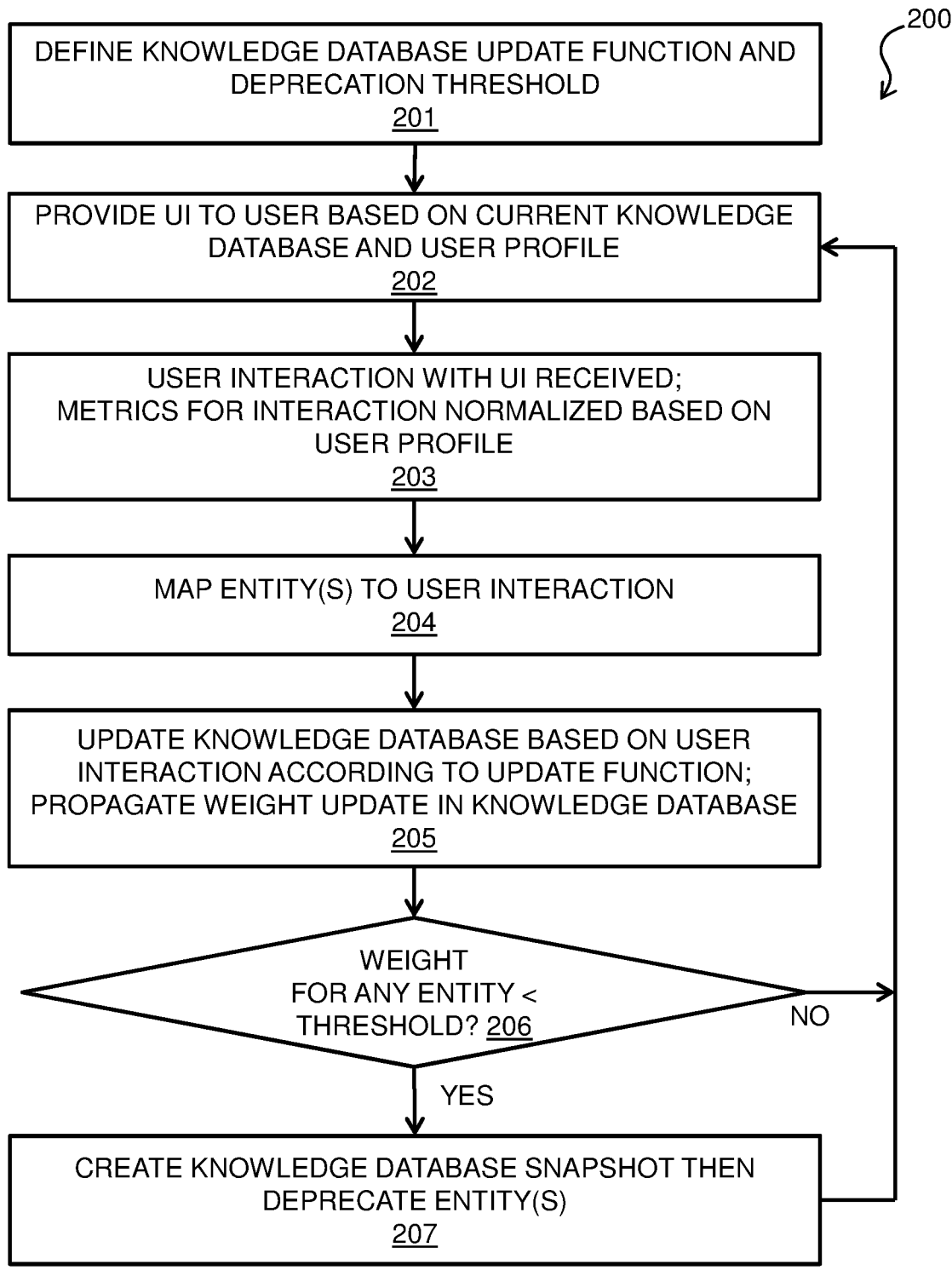
FIG. 2 is a flow diagram of a computer-implemented method configured and arranged to maintain a knowledge database based on user interactions with a user interface of the knowledge database in accordance with one or more embodiments of the present invention.

FIG. 2 shows a process flow diagram of a method 200 for maintaining a knowledge database system based on user interactions with a user interface of the knowledge database system in accordance with one or more embodiments of the present invention. Method 200 of FIG. 2 can be implemented in conjunction with any appropriate computer system, such as computer system 100 of FIG. 1 and/or the computer-based system 300 shown in FIG. 3. In block 201 of FIG. 2, a knowledge database update function is configured by, for example, an administrator. The knowledge database update function may specify how the knowledge database is updated based on user interactions with user interface elements that are mapped to knowledge database entities. The knowledge database update function may include particular metrics to quantify user interactions (e.g., a mean time per user session or a mean presence in user sessions), and how an update is propagated through the knowledge database to adjacent entities in the weight update function (e.g., N-hops-linear or N-hops-exponential-decay). A factor may be applied to the weight updates, and the weight updates may be applied to any appropriate number of entities that are linked to an entity. A deprecation threshold may also be defined in block 201 by, for example, an administrator, to determine when an entity should be removed from the knowledge database. The deprecation threshold may define a lower threshold required to deprecate an entity, e.g., 0.001. Each connection to an entity in the knowledge database may be weighted with a value between 0 and 1 in some embodiments. When an entity is removed from the database based on the deprecation threshold, a snapshot of the knowledge base may be taken so that, for example, an administrator may revert the knowledge base to its previous state.

In block 202, a user interface is provided to a user based on a current state of the knowledge database and the user's profile. The user interface may be provided to the user in any appropriate manner, for example, via a user device such as a mobile device, a personal computer, a tablet, or an IoT device. The user profile that is used to generate the user interface in block 202 may be specific to the user in some embodiments; in other embodiments, the user profile may be associated with a group to which the user belongs. The user profile may specify a portion of the knowledge database that is relevant to the user, and the user interface may be generated based on the specified portion of the knowledge database. The user interface may include a plurality of user interface elements, and each user interface element may correspond to one or more knowledge database entities.

In block 203, an interaction by the user with the user interface is detected. The interaction may correspond to any action by the user with respect to the user interface, including but not limited to mouse, keyboard, stylus, touch displays, hand gestures, facial expressions, verbal commands, and eye gaze interactions. Any appropriate user interaction attributes may be received with the notification of the user interaction, such as a timestamp, a target element, a label, content of the user interface element, and an event type. In some embodiments, in which the user device is an IoT device, the user interaction may include an action taken by the IoT device based on sensor data detected by the IoT device. Metrics for the user interaction may be determined and normalized in block 203 based on the received interaction and the user's profile. The normalization may account for the various available methods of interacting with the user interface, such as mouse, touch, and/or keyboard, and may determine a most common method of interaction used by the user. Some user tasks may require more interactions with the user interface than other user interactions; the normalization of block 203 may determine an amount of user interaction that corresponds to a single task.

In block 204, one or more knowledge database entities are mapped to the particular user interface element(s) associated with the user interaction. A user interaction that was received in block 203 may be associated with one or multiple user interface elements, and user interface elements may be associated with one or multiple knowledge database entities. Any knowledge database entities associated with the user interface element(s) that were part of the user interaction that was received in block 203 may be identified in block 204. The mapping between the user interaction and knowledge database entities may be performed using resource description framework (RDF) tags in some embodiments. In some embodiments, machine learning techniques, such as entity resolution, relation extraction, and entity matching may be used to identify mappings between knowledge database entities and user interface elements. Graph mining techniques may be combined with deep learning in order to scale the mapping in some embodiments. Link prediction may be used to infer new relationships in the knowledge database in some embodiments.

In block 205, the knowledge database is updated based on the user interaction that was determined in block 203, the mappings determined in block 204, and the knowledge database update function that was defined in block 201. One or more weights associated with any knowledge database entity that was determined to be a target of the user interaction in block 204 may be updated according to the function defined in block 201 based on the normalized metrics of block 203. The weight update may be propagated to adjacent entities according to the function defined in block 201 (e.g., N-hops-linear or N-hops-exponential-decay). Weights may be increased or decreased in block 205 based on a type of user interaction. In some embodiments of the invention, entities corresponding to responses that are used and that achieve a good result can be reinforced and have their weights increased in block 205, while entities corresponding to responses that are used and achieve a bad result, or are not used, can have their weights decreased in block 205. When the weights are increased for an entity, connections to that entity may also have their weights increased by a smaller factor. The factor may further decrease as the update propagates outward. In some embodiments, the updated weights may be normalized in the interval [0,1]. In some embodiments, increasing the weight of a first entity that was a target of a user interaction may trigger a corresponding decrease in a weight of a second entity that was not a target of the user interaction in block 205.

In block 206, it is determined whether a weight of any entity in the knowledge database is less than the deprecation threshold that was defined in block 201. If it is determined in block 206 that no entity in the knowledge database has a weight less than the deprecation threshold, flow proceeds from block 206 back to block 202, in which a user interface based on the updated knowledge database is provided to the user. In embodiments of method 200 in which no entities were deprecated based on the determination of block 206, there may be no changes to the user interface that is provided in a next iteration of block 202 as compared to a previous iteration of block 202, even though the weights of the entities in the knowledge database were updated in block 205.

If it was determined in block 206 that one or more entities in the knowledge database have a weight that is less than the deprecation threshold, flow proceeds from block 206 to block 207. In block 207, the system creates a snapshot for the current state of the knowledge database. The snapshot may be stored in any appropriate computer storage. In some embodiments, a snapshot may be used to roll back the knowledge database if needed. In some embodiments, the snapshot is associated with a particular user or user profile. A user profile may be associated with a single stored snapshot that illustrates a most recent state of the knowledge database for the user profile in some embodiments; the snapshot that is taken in block 207 may replace a previous snapshot in storage. After the snapshot is created, any elements that were identified in block 206 as having a weight lower than the threshold may be deprecated (i.e., removed) from the knowledge database. Any entities that may only be accessed through a deprecated entity may also be deprecated in block 207. Flow then proceeds from block 207 to block 202. In block 202, a user interface may be provided to the user based on the updated knowledge database (i.e., without the deprecated elements). In some embodiments, the user interface may be provided in block 202 based on a stored snapshot that is associated with the user. Blocks 202, 203, 204, 205, 206, and optionally block 207 may be repeated throughout operation of the user interface of the knowledge database system.

The process flow diagram of FIG. 2 is not intended to indicate that the operations of the method 200 are to be executed in any particular order, or that all of the operations of the method 200 are to be included in every case. Additionally, the method 200 can include any suitable number of additional operations.

Figure 3:
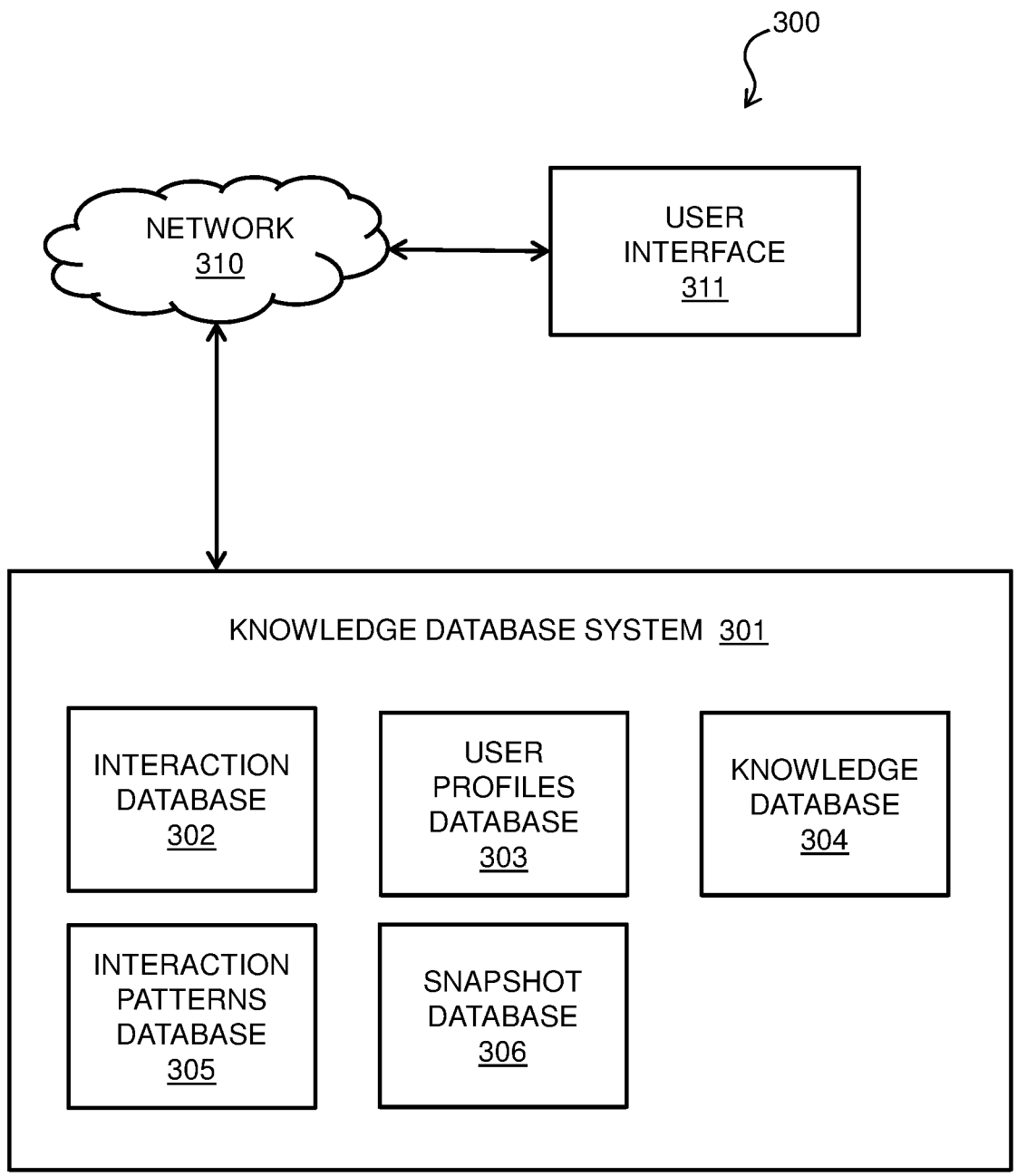
FIG. 3 is a block diagram of components of a system for maintaining a knowledge database based on user interactions with a user interface that accesses the knowledge database in accordance with one or more embodiments of the present invention.

Turning now to FIG. 3, system 300 for maintaining a knowledge database system based on user interactions with the user interface of the knowledge database system is generally shown in accordance with one or more embodiments of the present invention. The system 300 includes a knowledge database system 301 in communication with a user interface via a network 310. The knowledge database system 301 may be implemented in conjunction with any appropriate computer device, such as computer system 100 of FIG. 1. The network 310 may include any appropriate type(s) of communications network. The user interface 311 may be implemented in conjunction with any appropriate user device, which may incorporate elements of computer system 100 of FIG. 1, and may include, but is not limited to, a mobile device, a personal computer, a tablet, and an IoT device.

Knowledge database system 301 includes interaction database 302, user profiles database 303, the knowledge database 304, interaction patterns database 305, and snapshot database 306. Interaction database 302 may store any received interaction data from users of the knowledge database system 301. Any events triggered in a user interface such as user interface 311 may be recorded in interaction database 302. The information in interaction database 302 may include, but is not limited to, logs of any events triggered by interactions with user interface 311, including but not limited to mouse, keyboard, stylus, touch displays, hand gestures, facial expressions, verbal commands, and eye gaze interactions. For each event logged in the interaction database 302, any appropriate information may be stored, including but not limited to: a timestamp, a target UI element, content or a label associated with the target UI element, and a user or user profile identifier. The user profiles database 303 stores user information. In some embodiments, the user may be anonymous; in such embodiments, users may be clustered into user groups according to interaction behavior patterns. The knowledge database 304 stores a current version of the knowledge database. In various embodiments, the knowledge database may be represented as an ontology or a knowledge graph comprising interconnected entities. Interaction patterns database 305 may store interaction patterns related to each user profile in the user profiles database 303. For example, patterns may be represented as a weighted directed graph with recurrent interactions associated with a user or set of users. Snapshot database 306 may store snapshots of the knowledge database that is stored in knowledge database 304; in some embodiments, the snapshots stored in snapshot database 306 may each be associated with a user profile from user profiles database 303.

Embodiments of method 200 of FIG. 2 may be implemented in system 300. For example, the knowledge database update function and deprecation threshold that are defined in block 201 of method 200 may be applied to the knowledge database that is stored in knowledge database 304. User interface 311 may be generated and provided to the user in block 202 of method 200 based on the knowledge database 304, and further based on a user profile stored in user profiles database 303 and snapshot database 306. The user interaction may be detected by user interface 311 in block 203, and metrics regarding the user interaction may be stored and normalized in interaction database 302 based on interaction patterns database 305. The knowledge database system 301 may map the user interaction to entities in knowledge database 304 in block 204, and the knowledge database stored in knowledge database 304 may be updated based on the user interaction in block 205 of method 200. It may then be determined whether any entity in the knowledge database 304 has a weight that is lower than the deprecation threshold in block 206, and any entity identified in block 206 may be deprecated from the knowledge database in block 207. A snapshot may also be taken of the current state of the knowledge database in block 207 and stored in snapshot database 306.

It is to be understood that the block diagram of FIG. 3 is not intended to indicate that the system 300 is to include all of the components shown in FIG. 3. Rather, the system 300 can include any appropriate fewer or additional components not illustrated in FIG. 3 (e.g., additional memory components, embedded controllers, functional blocks, connections between functional blocks, modules, inputs, outputs, etc.). Further, the embodiments described herein with respect to system 300 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 4A:
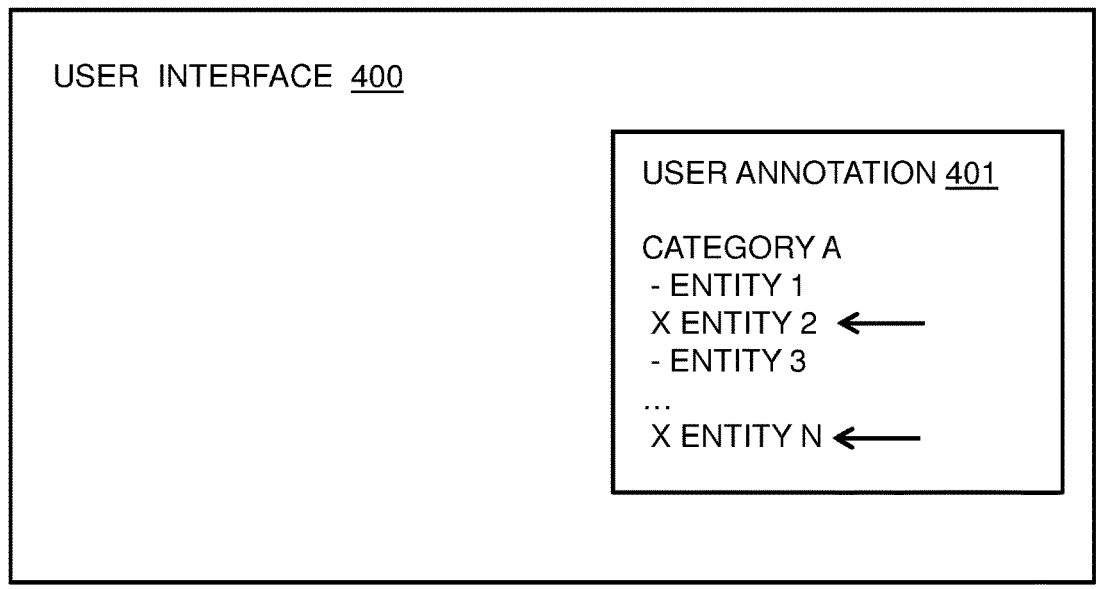
FIG. 4A is a block diagram of components of a user interface and a system for maintaining a knowledge database system based on user interactions with the user interface in accordance with one or more embodiments of the present invention.
Figure 4A:
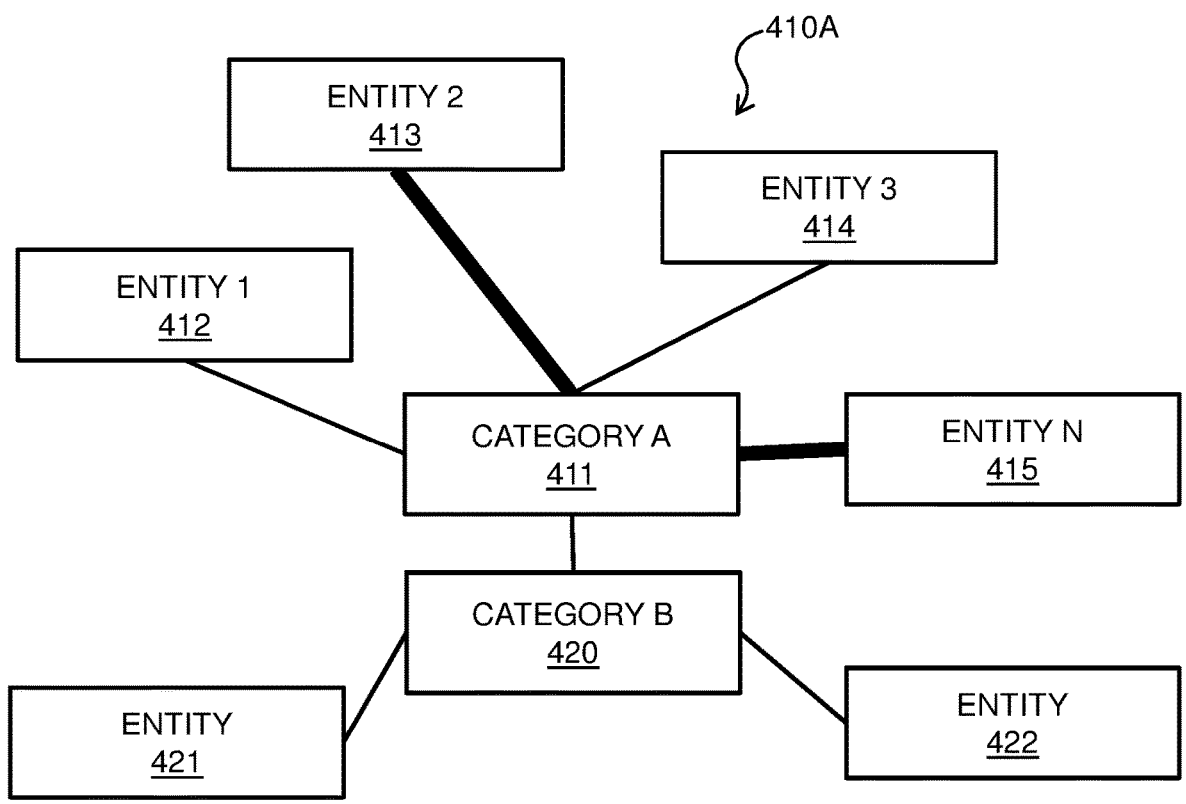
Figure 4B:
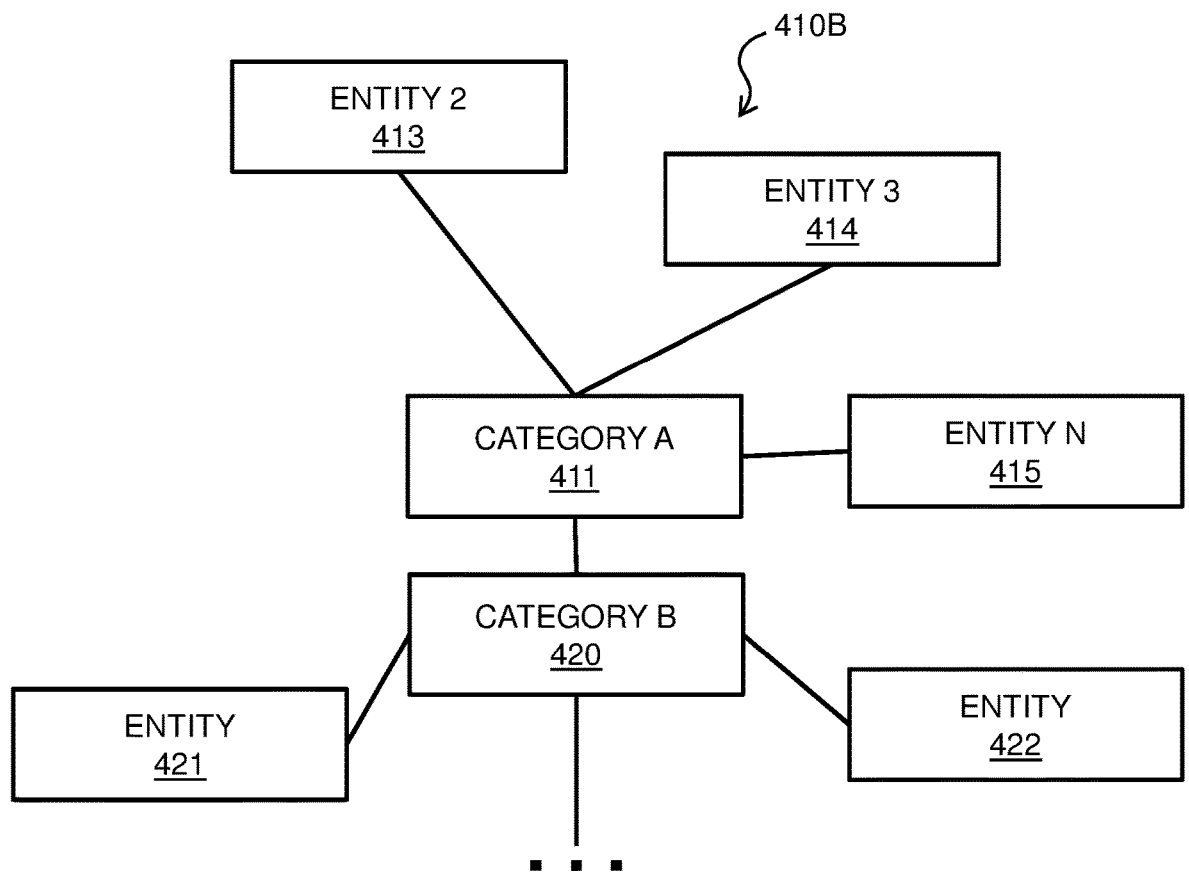
FIG. 4B is a block diagram of components of a system for maintaining a knowledge database based on user interactions with a user interface in accordance with one or more embodiments of the present invention.

Turning now to FIGS. 4A-B, FIG. 4A is a block diagram of components of a user interface and a system for maintaining a knowledge database system based on user interactions with the user interface in accordance with one or more embodiments of the present invention, and FIG. 4B is a block diagrams of components of a system for maintaining a knowledge database system based on user interactions with the database system in accordance with one or more embodiments of the present invention. The user interface 400 (shown in FIG. 4A) and associated knowledge databases 410A (shown in FIG. 4A) and 410B (shown in FIG. 4B) for user interaction-based knowledge database maintenance are generally shown in accordance with one or more embodiments of the present invention. User interface 400 and associated knowledge databases 410A and 410B are discussed with respect to method 200 of FIG. 2 and system 300 of FIG. 3. User interface 400 may be generated according to block 202 of method 200 of FIG. 2, and may correspond to embodiments of user interface 311 of system 300 of FIG. 3. User interface 400 includes a user annotation 401 that lists a plurality of entities (i.e., Entities 1-N) and illustrates user interactions with Entity 2 and Entity N. A user interaction is illustrated with respect to user annotation 401 may be detected in block 203 of method 200 of FIG. 2.

Knowledge database 410A of FIG. 4A can be stored in knowledge database 304 of FIG. 3. Knowledge database 410A includes Category A 411, which is linked to Entity 1 412, Entity 2 413, Entity 3 414, and Entity N 415. Each link from Category A 411 to Entities 1-N 412-415 has a respective weight. The weights may, in some embodiments, indicate a probability of a respective action or decision corresponding to each of Entities 1-N given the occurrence of a condition corresponding to Category A 411. The link between Entity 2 413 and Category A 411, and the link between Entity N 415 and Category A 411, are both highlighted based on the interactions with Entity 2 and Entity N that are shown in user annotation 401. The weight of Entity 2 413, and the weight of Entity N 415, may be increased based on the user interaction illustrated by user annotation 401, as described with respect to block 205 of method 200 of FIG. 2. The increases in the weights of Entity 2 413 and Entity N 415 may, in some embodiments, cause corresponding decreases in the weights of other entities linked to Category A 411 (e.g., Entity 1 413 and/or Entity 3 414). Knowledge database 410A further includes Category B 420 and linked Entity 421 and Entity 422. Any weight updates to Entities 1-N 412-415 may be propagated to any of Category B 420, Entity 421, and Entity 422, based on the knowledge database update function defined in block 201 of method 200 of FIG. 2.

FIG. 4B illustrates knowledge database 410B, which may correspond to knowledge database 410A of FIG. 4A after deprecation of Entity 1 412 according to blocks 206 and 207 of method 200 of FIG. 2. For example, while both Entity 1 412 and Entity 3 414 may have had their weights decreased by the user interaction-based knowledge database update, only Entity 1 412 may have been determined to have a weight below the deprecation threshold that was defined in block 201 of method 200 of FIG. 2, such that Entity 1 412 is removed from knowledge database 410B in block 207 of method 200.

For example, the knowledge databases 410A-B may correspond to a medical database that is used by medical professionals to determine effectiveness of treatments. Entity 1 412 may correspond to a first treatment that resulted in a bad outcome for a first patient having a condition corresponding to Category A 411, and Entity 2 413 may correspond to a second treatment that resulted in a good outcome for the first patient. Over time, if the first treatment is ineffective with a number of patients, the Entity 1 412 corresponding to the first treatment may be deprecated from the knowledge database 410A-B, while the weight assigned to the Entity 2 413 corresponding to the second treatment may be raised. The knowledge database 410B may be used to determine a treatment for a user having the condition corresponding to Category A and having a profile that is similar to the first patient.

In another example, the knowledge databases 410A, 410B can correspond to a user interface comprising an IoT device. In such an embodiment, user interaction may include a sensor of the IoT device detecting a condition (e.g., a temperature or an airflow) corresponding to Category A 411 and taking a course of action corresponding to an entity (e.g., Entity 2 413). A server may send a command to the IoT device to perform the action corresponding to the entity based on the condition detected by the sensor data. A lack of feedback regarding an action that was taken by the IoT device may be regarded as a user interaction indicating that the action was correct, such that a weight of the entity corresponding to the correct action is increased according to block 205 of method 200. A user interaction may also include a user indicating to the server that an action taken by the IoT device in response to a particular condition was incorrect, in which case an entity corresponding to the incorrect action may have its weight decreased according to block 205 of method 200.

It is to be understood that the block diagram of FIG. 4A is not intended to indicate that the user interface 400 and associated knowledge databases 410A and 410B are to include all of the components shown in FIGS. 4A and 4B. Rather, the user interface 400 and associated knowledge databases 410A and 410B can include any appropriate fewer or additional components not illustrated in FIGS. 4A and 4B (e.g., entities, categories, connections, weights, user interface elements, etc.). Further, the embodiments described herein with respect to user interface 400 and associated knowledge databases 410A and 410B may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
generating, by a processor, a user interface based on a knowledge database comprising a plurality of entities, wherein the user interface comprises a plurality of user interface elements, each user interface element of the plurality of user interface elements corresponding to one or more of the plurality of entities of the knowledge database;
receiving a user interaction corresponding to the user interface; and
updating the knowledge database based on the received user interaction, wherein updating the knowledge database based on the received user interaction comprises:
determining a user interface element associated with the received user interaction;
mapping the determined user interface element to a first entity of the plurality of entities of the knowledge database;
performing a weight update corresponding to the plurality of entities, including the first entity;
identifying an updated weight of another entity among the plurality of entities different from the first entity in response to the weight update;
comparing the updated weight that corresponds to the another entity to a deprecation threshold; and
removing the another entity from the knowledge database in response to the updated weight being lower than the deprecation threshold.

2. The computer-implemented method of claim 1 further comprising:
determining a user profile associated with the user interaction; and
normalizing metrics of the user interaction based on the user profile.

3. The computer-implemented method of claim 1, wherein the weight update corresponding to the first entity comprises increasing or decreasing a weight of the first entity based on a type of the user interaction.

4. The computer-implemented method of claim 1, wherein the weight update corresponding to the first entity is performed based on a knowledge database update function that is defined by an administrator of the knowledge database.

5. The computer-implemented method of claim 4 further comprising propagating the weight update corresponding to the first entity to a second entity in the knowledge database based on the knowledge database update function.

6. The computer-implemented method of claim 1 further comprising generating an updated user interface based on the knowledge data based without the another entity.

7. A system comprising:
a memory having computer readable instructions; and
one or more processors for executing the computer readable instructions, the computer readable instructions controlling the one or more processors to perform operations comprising:
generating a user interface based on a knowledge database comprising a plurality of entities, wherein the user interface comprises a plurality of user interface elements, each user interface element of the plurality of user interface elements corresponding to one or more of the plurality of entities of the knowledge database;
receiving a user interaction corresponding to the user interface; and
updating the knowledge database based on the received user interaction, wherein updating the knowledge database based on the received user interaction comprises:
determining a user interface element associated with the received user interaction;
mapping the determined user interface element to a first entity of the plurality of entities of the knowledge database;
performing a weight update corresponding to the first entity plurality of entities, including the first entity;
identifying an updated weight of another entity among the plurality of entities different from the first entity in response to the weight update;
comparing the updated weight that corresponds to the another entity to a deprecation threshold; and
removing the another entity from the knowledge database in response to the updated weight being lower than the deprecation threshold.

8. The system of claim 7 further comprising:
determining a user profile associated with the user interaction; and
normalizing metrics of the user interaction based on the user profile.

9. The system of claim 7, wherein the weight update corresponding to the first entity comprises increasing or decreasing a weight of the first entity based on a type of the user interaction.

10. The system of claim 7, wherein the weight update corresponding to the first entity is performed based on a knowledge database update function that is defined by an administrator of the knowledge database.

11. The system of claim 10 further comprising propagating the weight update corresponding to the first entity to a second entity in the knowledge database based on the knowledge database update function.

12. The system of claim 7 further comprising generating an updated user interface based on the knowledge data based without the another entity.

13. A computer program product comprising a computer readable storage medium having program instructions embodied therewith, the program instructions executable by a processor to cause the processor to perform operations comprising:
generating a user interface based on a knowledge database comprising a plurality of entities, wherein the user interface comprises a plurality of user interface elements, each user interface element of the plurality of user interface elements corresponding to one or more of the plurality of entities of the knowledge database;
receiving a user interaction corresponding to the user interface; and
updating the knowledge database based on the received user interaction, wherein updating the knowledge database based on the received user interaction comprises:
determining a user interface element associated with the received user interaction;
mapping the determined user interface element to a first entity of the plurality of entities of the knowledge database;
performing a weight update corresponding to the plurality of entities, including the first entity;

identifying an updated weight of another entity among the plurality of entities different from the first entity in response to the weight update;

comparing the updated weight that corresponds to the another entity to a deprecation threshold; and removing the another entity from the knowledge database in response to the updated weight being lower than the deprecation threshold.

14. The computer program product of claim 13, wherein the operations further comprise:

determining a user profile associated with the user interaction; and normalizing metrics of the user interaction based on the user profile.

15. The computer program product of claim 13, wherein the weight update corresponding to the first entity comprises increasing or decreasing a weight of the first entity based on a type of the user interaction.

16. The computer program product of claim 13, wherein the weight update corresponding to the first entity is performed based on a knowledge database update function that is defined by an administrator of the knowledge database.

17. The computer program product of claim 16, wherein the operations further comprise propagating the weight update corresponding to the first entity to a second entity in the knowledge database based on the knowledge database update function.

* * * * *